United States Patent [19]

Mizuno

[11] Patent Number: 5,666,013
[45] Date of Patent: Sep. 9, 1997

[54] MAGNETIC BEARING

[75] Inventor: Takeshi Mizuno, Inagi, Japan

[73] Assignee: Seiko Seiki Kabushiki Kaisha, Japan

[21] Appl. No.: 158,900

[22] Filed: Nov. 29, 1993

[30] Foreign Application Priority Data

Dec. 7, 1992 [JP] Japan .................................. 4-326618

[51] Int. Cl.$^6$ .................................................. H02K 7/09
[52] U.S. Cl. ...................... 310/90.5; 310/68 R; 310/68 B
[58] Field of Search .............................. 310/90.5, 65 R, 310/68 A, 68 B, 68 E

[56] References Cited

U.S. PATENT DOCUMENTS

| | | | |
|---|---|---|---|
| 4,642,500 | 2/1987 | Higuchi et al. | 310/90.5 |
| 4,652,820 | 3/1987 | Maresca | 324/207 |
| 4,686,404 | 8/1987 | Nakazeki et al. | 310/90.5 |
| 4,839,550 | 6/1989 | Mizuno | 310/90.5 |
| 4,879,500 | 11/1989 | Kanemitsu | 318/632 |
| 4,885,491 | 12/1989 | Hiyama et al. | 310/90.5 |
| 5,003,211 | 3/1991 | Groom | 310/90.5 |
| 5,202,824 | 4/1993 | Chen | 364/508 |
| 5,247,219 | 9/1993 | Nakagawa et al. | 310/90.5 |
| 5,313,399 | 5/1994 | Bezle | 364/463 |
| 5,412,999 | 5/1995 | Vigmostad et al. | 73/862.3 |

Primary Examiner—Steven L. Stephan
Assistant Examiner—Elvin G. Enad
Attorney, Agent, or Firm—Adams & Wilks

[57] ABSTRACT

By using a hysteresis amplifier for driving an electromagnet, a highly accurate electromagnetic bearing may be produced without the need for independent position detectors to maintain the levitated position of a rotor constant. In one embodiment, the electromagnetic bearing includes multiple electromagnets for levitating a rotor in a predetermined position. Multiple hysteresis amplifiers each supply a switching signal for driving each of the electromagnets. The switching frequency of the switching signals changes in accordance with the inductance of the electromagnets, which varies in accordance with the relative position of the electromagnets. A phase comparator detects the phase difference between the switching waveforms of each hysteresis amplifier. A loop filter supplies a target current value converted from an output of the phase comparator to the hysteresis amplifiers. By controlling the input signals to the respective hysteresis amplifiers to maintain the frequency of the switching signal output of the respective hysteresis amplifiers constant, the position of the rotor is also maintained constant. Accordingly, a magnetic bearing may precisely control the levitated position of a rotor without the use of position detectors.

11 Claims, 8 Drawing Sheets

MAGNETIC BEARING

BACKGROUND OF THE INVENTION

The present invention relates to a magnetic bearing characterized in having a rotor levitated by electromagnet power and maintained at a certain levitated constant position through detecting its position.

Figure 14:
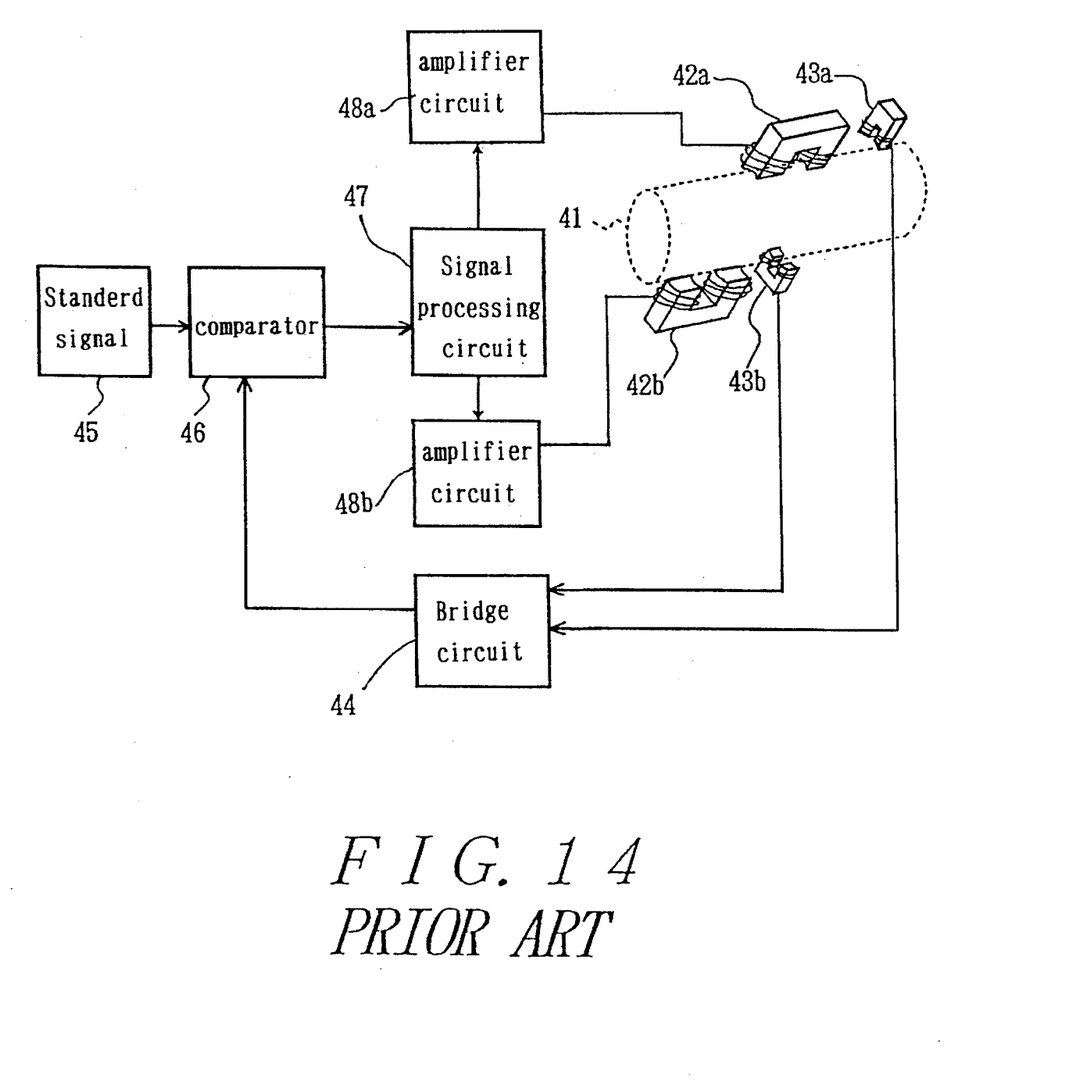
FIG. 14 is a block diagram of a conventional electromagnetic bearing.

Recently electromagnetic levitation devices which can convey or carry works without contact are utilized for carrier system in such an atmosphere where highly clean conditions must be maintained, like IC manufacturing equipments. In such electromagnetic levitation devices, a magnetic bearing having a rotor which is levitated with electromagnetic power and of which the levitating position is maintained in a certain constant position has been used. FIG. 14 shows a block diagram of a conventional electromagnetic bearing configuration. This kind of electromagnetic bearing has two electromagnets 42a, 42b which are positioned to be facing each other, and two position sensors 43a, 43b. Moreover, the electromagnetic bearing comprises a bridge circuit 44 to which a detecting signal from position sensors 43a, 43b is input, a comparator 46 which compares the output signal from the above bridge circuit 44 with a standard signal 45, a signal processing circuit 47 for processing an output signal of the comparator, and amplifier circuits 48a, 48b that amplify the output signal from the signal processing circuit 47 and transfer its output to electromagnets 42a, 42b.

In this electromagnetic bearing, a rotor 41 is levitated and held in a predetermined position. The position of the rotor is detected by the position sensor 43a, 43b, and a signal that changes according to the position of the rotor 41 is output from the bridge circuit 44 to the comparator 46. By operation the comparator 46, is obtained a signal that changes according to the compared difference of the output signal from the bridge circuit 44 with the standard signal 45, that is, a signal that changes according to the compared difference of the position of the rotor with its standard position, and this signal is then processed by signal processing circuit 47, and then output to the amplifiers 48a, 48b. By the amplifiers 48a, 48b the exciting current is supplied to electromagnets 42a, 42b. The rotor 41 is controlled to be held at a predetermined position as above.

In the prior art electromagnetic bearing, it is technologically difficult to detect the rotor's position with high accuracy using a conventional position sensor and because a position sensor is needed to detect the rotor position there exists a problem in that an expensive sensor of higher accuracy is needed in order to accurately control the rotor position.

And in the prior art electromagnetic levitation system, it is usually the case for holding the position accurately that an integrating element is inserted into the feedback loop. But this kind of an integrating element is more or less an approximate one. For example, it is not possible that direct current gain can not be infinite due to the step output of the operational amplifier when the integrating element is comprised of an analog circuit. And a further deviation is included to a certain degree because of quantization errors in AD conversion and in computer process when the integrating element is comprised by a digital control device. These problems show the existence of a certain limitation in the improvement of sustaining accuracy by arrangement of integrating element in the prior art electromagnetic levitation systems.

SUMMARY OF THE INVENTION

It is an object of this invention to provide an electromagnetic bearing with which higher accuracy positioning can be realized by control with means having a simplified configuration.

The electromagnetic bearing of the present invention comprises an electromagnet to levitate a rotor by way of magnetic power, a hysteresis amplifier to supply an exciting current to the electromagnet, and a position control means to control the position of the rotor with a phase locked loop which controls the switching frequency of the hysteresis amplifier by way of controlling the exciting current to be supplied from the hysteresis amplifier according to the switching phase of the hysteresis amplifier. In this invention, a hysteresis amplifier is used which has characteristics such that its switching frequency changes according to the inductance. Thus, utilizing the fact that the switching frequency of the hysteresis amplifier changes according to the gap between a rotor and an electromagnet, the position of said rotor is detected without a position sensor.

The rotor is kept in a predetermined position by controlling the switching frequency maintain a predetermined constant value using the phase locked loop.

DETAILED DESCRIPTION OF PREFERRED EMBODIMENTS

Hereinafter a preferred embodiment of electromagnetic bearing in this invention will be described referring to FIG. 1 through FIG. 11.

Figure 1:
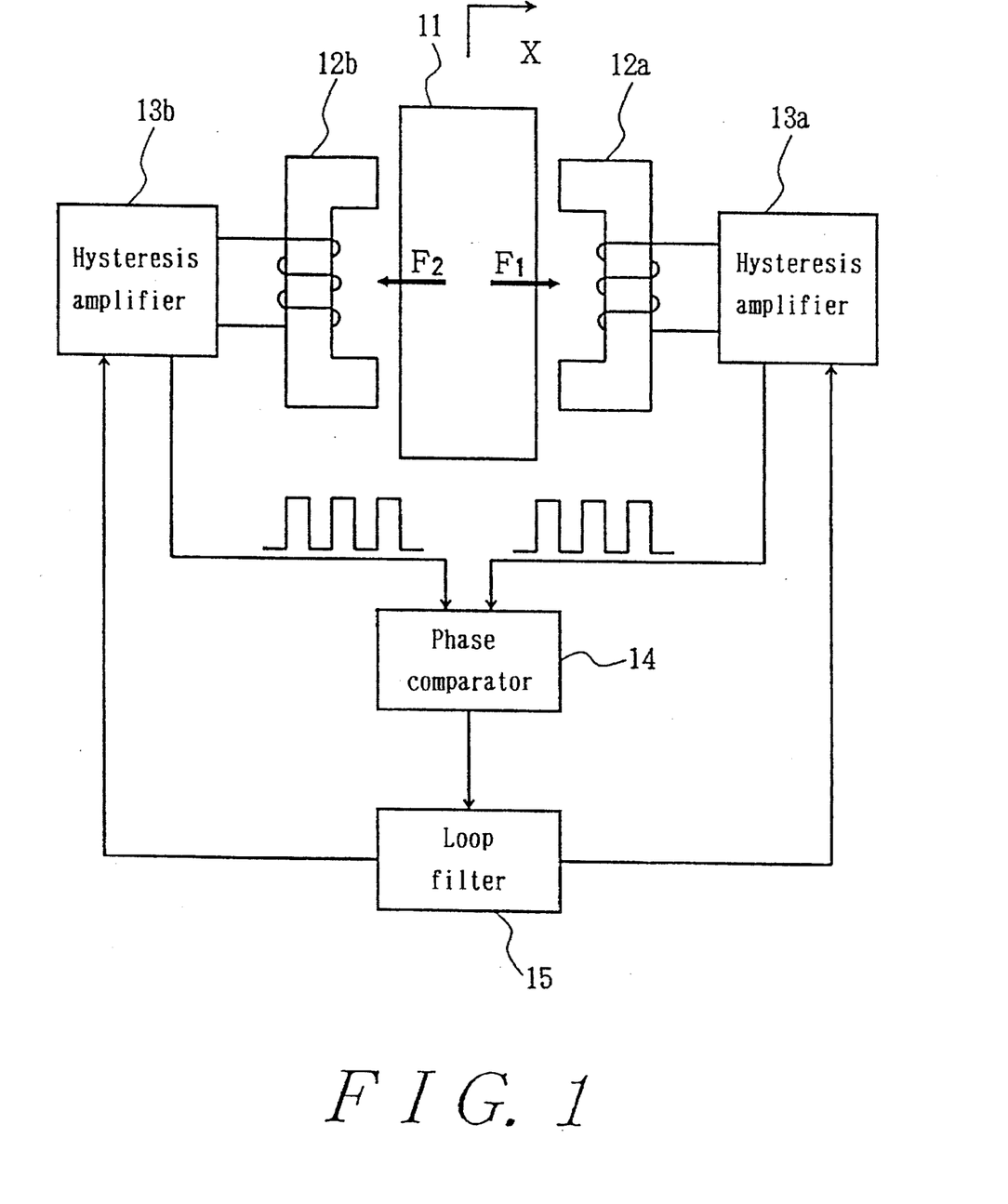
FIG. 1 is a block diagram of a first embodiment of the electromagnetic bearing in this invention.

FIG. 1 is a block diagram of an embodiment of a configuration of the electromagnetic bearing in this invention.

As shown in FIG. 1, the electromagnetic bearing in the first embodiment in this invention includes two electromagnets 12a, 12b which are laid out in an opposite direction in each other, both being disposed on opposite sides and facing the center of a rotor 11, hysteresis amplifiers 13a, 13b which supply an exciting current to the said electromagnets 12a, 12b, a phase comparator 14 which detects the phase difference of both switching wave shapes of each hysteresis amplifier 13a, 13b, and a loop filter 15 which supplies to each hysteresis amplifier 13a, 13b direct current to which the output from the said phase comparator 14 is supplied and converted.

In this electromagnetic bearing exciting current is supplied to electromagnets 12a, 12b from hysteresis amplifiers 13a, 13b and with magnetic force (attraction $F_1$, $F_2$) of electromagnets 12a, 12b, the rotor 11 is levitated.

And the switching wave form of hysteresis amplifier 13a, 13b is input into phase comparator 14, and the phase difference between both wave forms is detected. The output of the phase comparator 14 is converted through loop filter 15 to a pair direct current outputs, which are respectively supplied to each hysteresis amplifier 13a, 13b. Like the above, a phase locked loop is composed with hysteresis amplifier 13a, 13b phase comparator 14 and loop filter 15, and the position X of the rotor 11 is controlled to be held and maintained at a predetermined position.

In accordance with this embodiment, a hysteresis amplifier 13 (which represents 13a and 13b), that has characteristics in that the switching frequency changes according to inductance, is applied as an amplifier which excites electromagnet 12 (which represents 12a, and 12b). That is to say, the position of a rotor 11 is calculated from the switching wave frequency of the hysteresis amplifier 13, utilizing the change in the switching frequency of the hysteresis amplifier 13 according to the gap (which is the position X of the rotor 11) between electromagnet 12 and the rotor 11. As a result, there is no need for a position sensor.

Again in this embodiment, the switching frequency of the hysteresis amplifier 13 is controlled to be constant using the phase Locked Loop, and therefore a rotor 11 is held and maintained at a certain position. Accordingly, higher precision control of a rotor 11 can be realized through the detectability of control error at phase shift level.

In particular, the integration element of the phase locked loop in this embodiment is ideal in mathematical relation in that phase is equal to the integral of angular frequency. Accordingly, higher precision control can be realized because the above-described error is avoided.

Next, an outline of operation in hysteresis amplifier 13 will be explained referring to FIG. 2, and FIG. 3.

Figure 2:
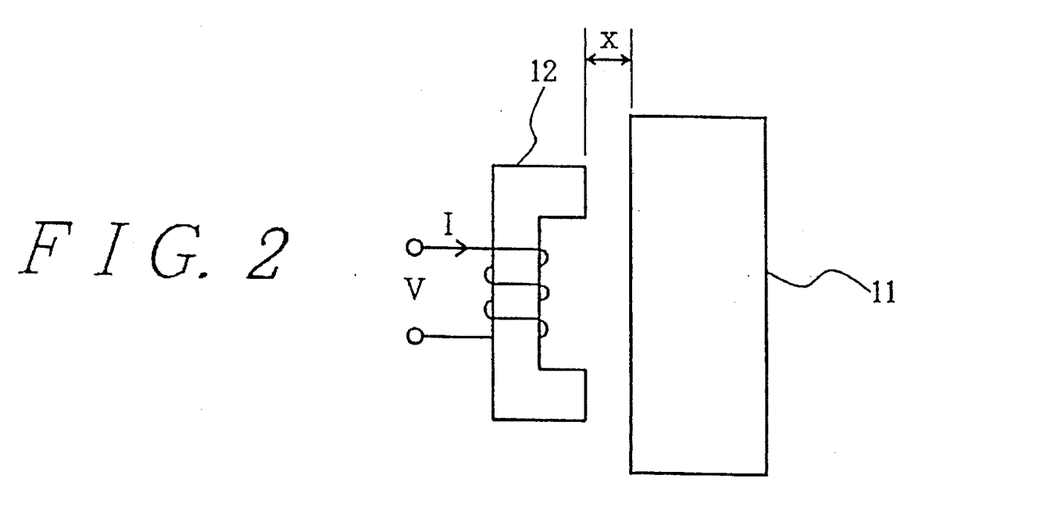
FIG. 2 is an explanatory drawing of electromagnet and a rotor in a embodiment.

As shown in FIG. 2, V is the voltage charged to the coil of an electromagnet 12, I is current passing through the coil, and X is the gap between electromagnet 12 and a rotor 11.

Figure 3:
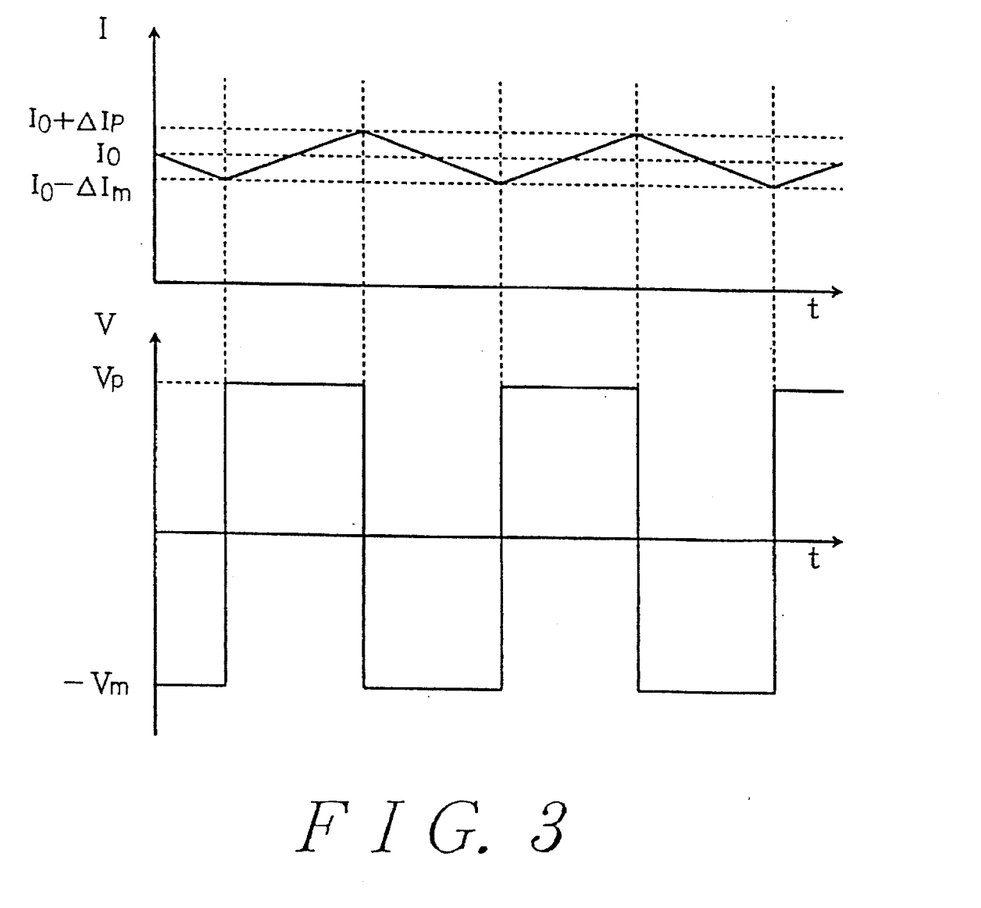
FIG. 3 shows the wave form drawing which describes the relation between electric current in the electromagnet coil and applied voltage, in the embodiment of FIG. 2.

FIG. 3 shows the drawing of the wave, which exhibits the relationship between the current I and voltage V. Target current value $I_0$, and its interval $\pm \Delta I$ between upper and lower limits are set into the hysteresis amplifier and hysteresis amplifier 13 changes voltage V to $-Vm$ when actual current value attains the upper limit $I_0+\Delta I_p$ and to $V_p$ when actual current value attains the lower limit $I_0-\Delta Im$.

In this embodiment, the position of a rotor 11 is detected from the of switching frequency, utilizing the characteristics that the switching frequency of voltage in the hysteresis amplifier is approximately in proportion to the gap between electromagnet 12 and rotor 11.

Figure 4:
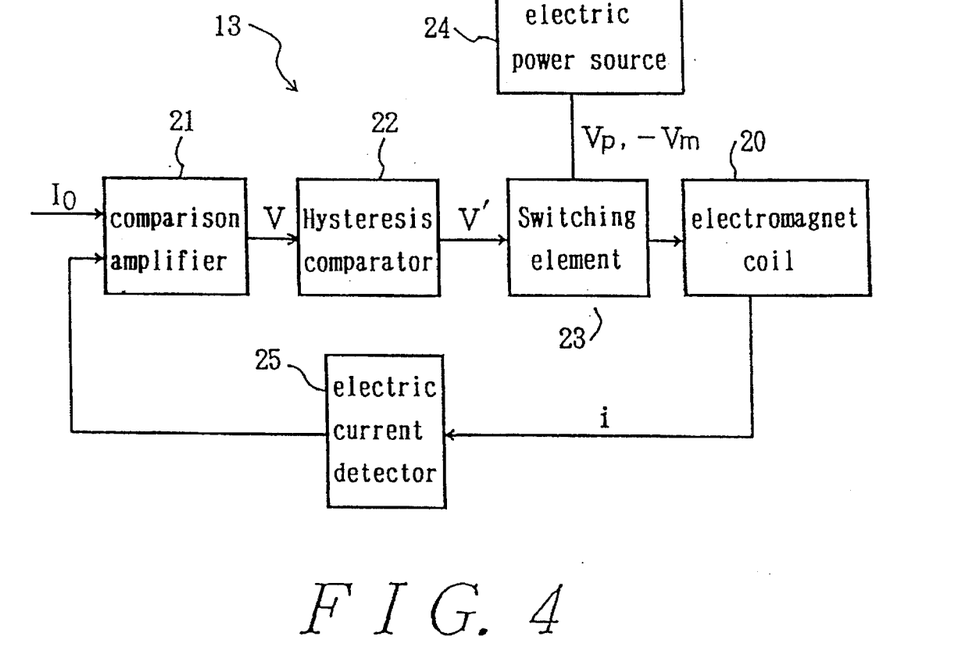
FIG. 4 is a block diagram which describes the configuration of the hysteresis amplifier shown in FIG. 1.

FIG. 4 is the block diagram of hysteresis amplifier configuration. As shown in FIG. 4, comparison amplifier 21 into which target current value $I_0$ is input and hysteresis comparator 22 into which output V from the said comparison amplifier is input are equipped in hysteresis amplifier 13. A switching element 23 which receives output voltage V' from hysteresis comparator 22 and switches two level voltage of the source 24 and output into the coil 20 of electromagnet 12, and an electric current detector 25 which detects the current in coil 20 of electromagnet 12 and output into comparison amplifier 21 are also equipped in the above hysteresis amplifier 13.

Target current value $I_0$ is the preferable value of current which should be in coil 20 of electromagnet, which is, generally speaking, given by the summation of bias current value and current value for control. And this target current value $I_0$ is supplied by loop filter 15 in FIG. 1.

Comparison amplifier 21 outputs voltage V[$V=K_v(I_0-i)$, where $K_v$ is constant], which is proportionate to the difference between the target current value $I_0$ and current in coil i.

Figure 5:
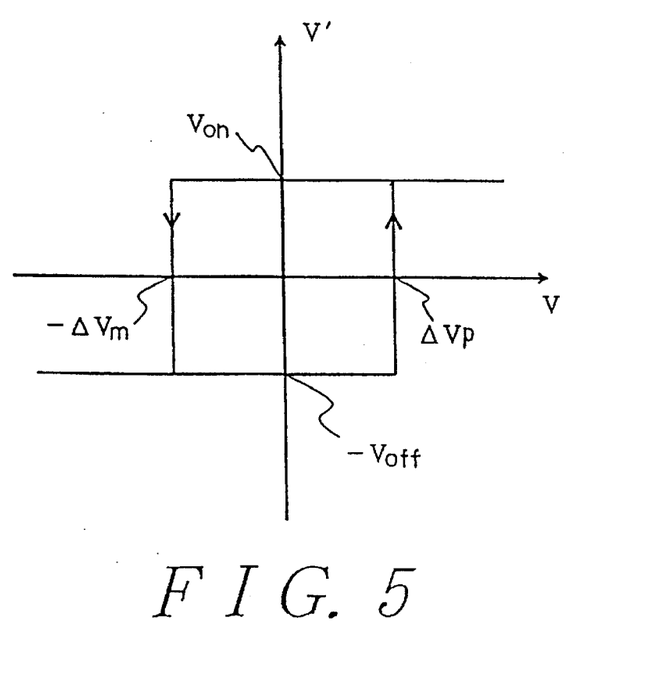
FIG. 5 shows a character graph of hysteresis comparator characteristics in FIG. 4.

The threshold value of hysteresis comparator 22 changes according to the past history of input signal, and an example of its characteristics is shown in FIG. 5. Suppose that $V_{on}$ and $-V_{OFF}$ corresponds respectively to the higher level and lower level of output voltage V' of the hysteresis comparator 22 that $\Delta V_p$ is input voltage when output voltage changes from $-V_{OFF}$ to $V_{on}$, and that $-\Delta Vm$ is input voltage when output voltage changes from $V_{on}$ to $-V_{OFF}$.

Switching element 23 is such a element (transistor, FET, thyristor and etc.) that changes its voltage onto the coil 20, from higher voltage ($V_P$) to negative voltage ($-Vm$) or sufficiently lower enough voltage ($V_L$), according to the input signal level ($V_{ON}$, $V_{OFF}$).

By the way, the switching wave form which is supplied to phase comparator 14 in FIG. 1 can be output form of hysteresis comparator 22 or of switching element 23, or the binary wave that is converted from the output of the electric current detector 25.

Next, the operation of hysteresis amplifier 13 will be explained hereunder.

The current in coil 20 fluctuates in chopping wave shape with its center of the target current value $I_0$. The reason is as follows.

Suppose at a certain time, that current in coil 20 is I'($I_0-\Delta Im<I'<I_0$), that $V_0$ is output voltage of hysteresis comparator 22, and that $V_p$ is the voltage applied to the coil 20.

Figure 7:
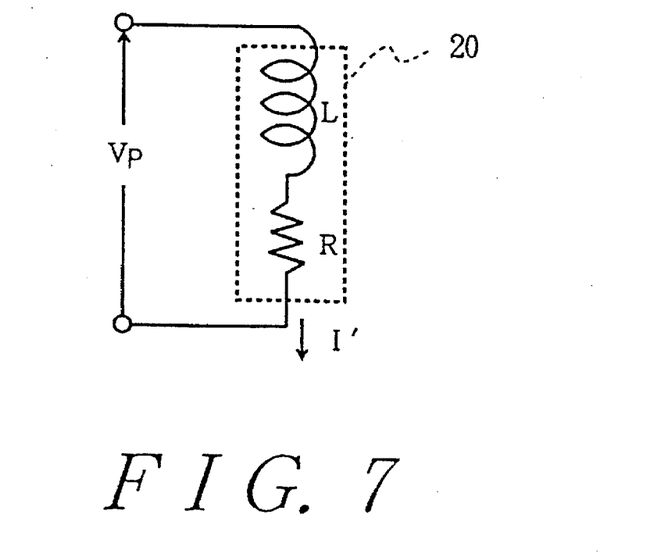
FIG. 7 is a circuit drawing of the equivalent circuit of electromagnet coil in an embodiment.

Coil 20 forms a series circuit with inductance L and with resistor R as shown in FIG. 7, where the component values are set such that $V_p>>(I_0+\Delta I_p)/R$. In this case, coil current level increases gradually for inductance L of coil 20, and becomes equal to $I_0$. At the same time, the output voltage of comparison amplifier also changes in its code (for example, positive to negative). But for some time thereafter, the output of the hysteresis comparator 22 stays at $V_{on}$ because of the hysteresis characteristics of hysteresis comparator 22. Therefore the current increases over $I_0$.

In the meantime its output voltage changes to $-V_{off}$ and the voltage supplied to coil 20 also changes from $V_p$ to $-V_m$, when the value of the output voltage V of comparison amplifier 21 becomes smaller than $-\Delta V_m$. Because of this, the current in coil 20 begins to decrease. Assuming that $I_0+\Delta I_p$ is the value of the current at the point where the output of hysteresis comparator 22 changes to $-V_{off}$, there exists the relation of $K_v \cdot \Delta I_p = \Delta V_m$.

In the meantime, the value of the current decreases to $I_0$, but its value decreases furthermore without changing to $V_{ON}$ immediately because of the hysteresis characteristics of the hysteresis comparator 22. And now, since the value of output voltage V of comparison amplifier 21 becomes larger than $\Delta V_p$, the output of hysteresis comparator 22 changes to $V_{ON}$, the voltage charged to coil 20 again turns to Vp, and the value of the current begins to increase. Assuming that $I_0-\Delta Im$ is the value of the current at the point where the output of hysteresis comparator 22 changes to $V_{ON}$, there exists the relation of $K_v \cdot \Delta Im = \Delta V_p$.

Figure 6:
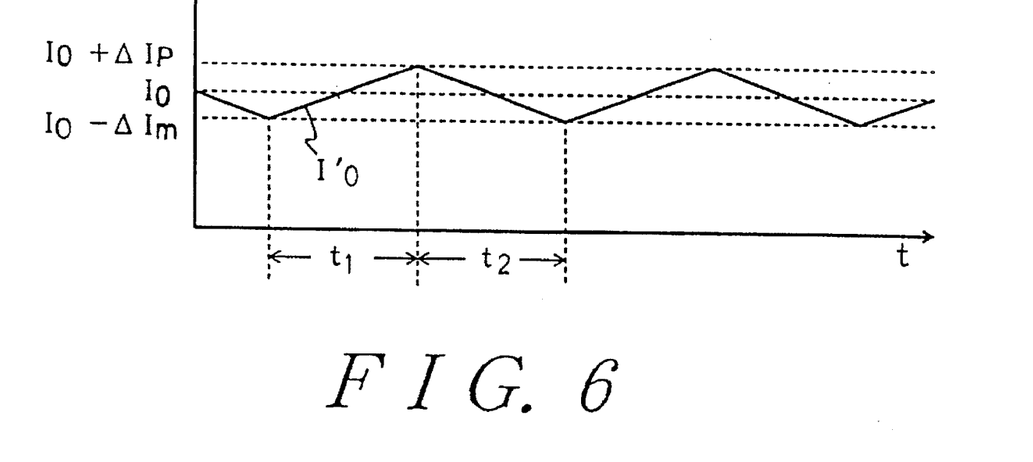
FIG. 6 is a wave form drawing of a current in magnetic coil by way of hysteresis amplifier in FIG. 4.

The hysteresis amplifier 13 repeats the operation above and as shown in FIG. 6, switching cycle T is $t_1+t_2$, and the switching frequency f is 1/T where $t_1$ is the period during which the current in coil 20 increases from $I_0-\Delta Im$ to $I_0+\Delta I_p$, and where $t_2$ is the period during which current in coil 20 decreases from $I_0+\Delta I_p$ to $I_0-\Delta Im$.

It will now be explained why the switching frequency of hysteresis amplifier 13 changes approximately in proportion to the gap X between electromagnet 12 and a rotor 11.

Figure 8:
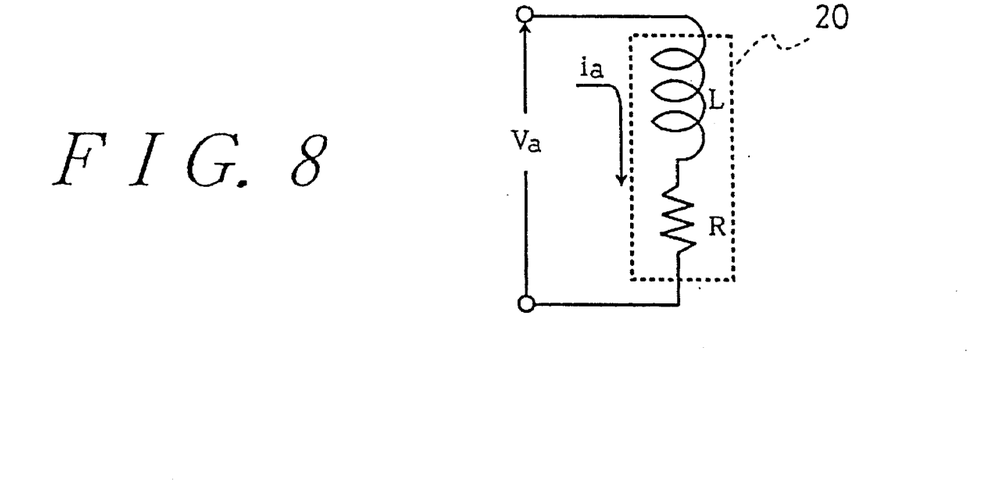
FIG. 8 is an explanatory drawing for the purpose of exhibiting current and applied voltage in the circuit of FIG. 7.

As shown in FIG. 8, coil 20 of electromagnet 12 is supposed to be a series connection of Inductance L and resistor R.

Figure 9:
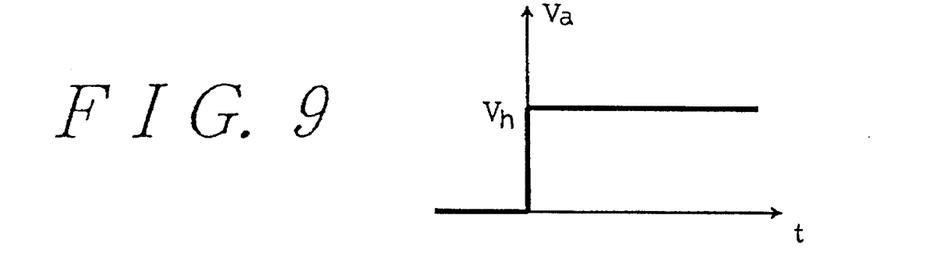
FIG. 9 is a wave form drawing of step-wise voltage applied in the circuit of FIG. 8.

Here, suppose that step like voltage Va is charged to the both ends of coil 20 at the initial condition where is the current in coil ia(0)=0. That is to say, Va=0, at the time t<0, and $Va=V_h$, at the time $t \geq 0$, as shown in FIG. 9.

Figure 10:
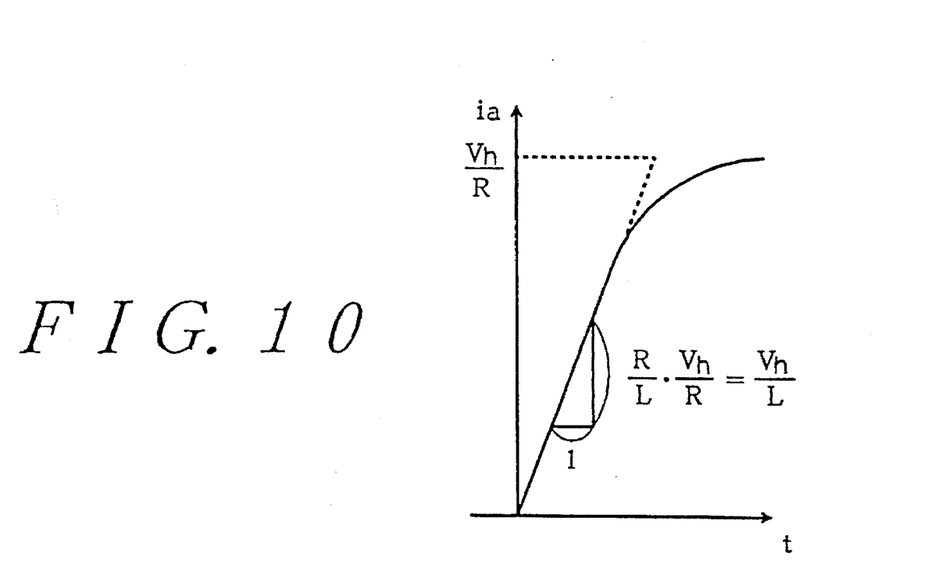
FIG. 10 is a graph of characteristics, that exhibits the change in current when step-wise voltage (FIG. 9) in the circuit of FIG. 8 is applied.
Figure 11:
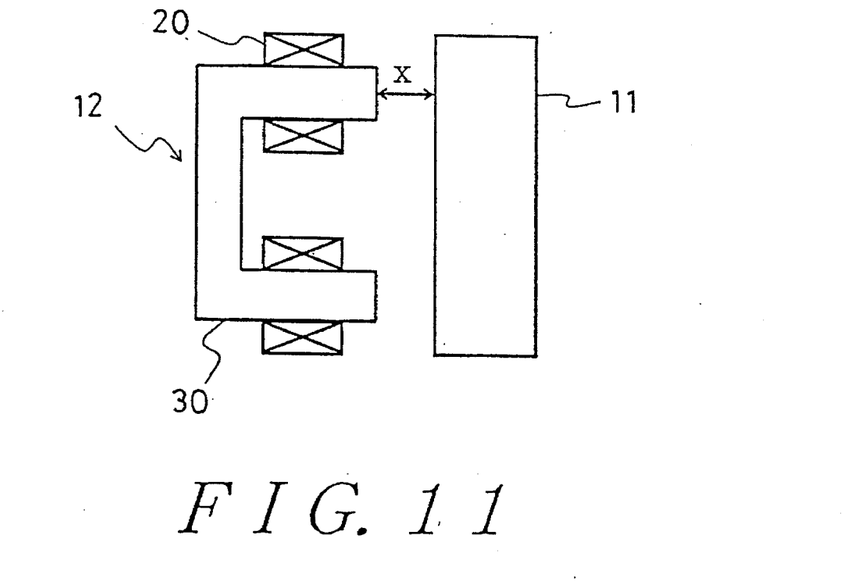
FIG. 11 is a electromagnet and a rotor in an embodiment.

Then, the current in coil increases up to the last value $(V_h/R)$ as shown in FIG. 10. At slightly above t=0, that is, when $ia<<V_h/R$, the increase rate of the current is $(R/L) \cdot (V_h/R) = (V_h/L)$.

As mentioned before, when the relation $(I_0+\Delta I_p) = (V_h/R)$ is satisfied in the operation of hysteresis amplifier 13, $t_1 = L(\Delta I_p + \Delta Im)/V_h$ where $t_1$ is the period during which the current increases from $I_0-\Delta Im$ to $I_0+\Delta I_p$, because $(V_h/L) \cdot t_1 = (\Delta I_p + \Delta Im)$.

Likewise, when Vm is chosen such that the relation $(I_0-\Delta I_p)+(Vm/R)>>I_0+\Delta I_p$ is satisfied, $t_2=L(\Delta I_p+\Delta Im)/Vm$ where $t_2$ is the period when the current decreases from $I_0+\Delta I_p$ to $I_0-\Delta Im$.

Therefore, switching cycle $T(=t_1+t_2)$ is may be represented by $T=L(\Delta I_p+\Delta Im) \cdot (1/V_h+1/Vm)$.

On the other hand, the value of inductance L of coil 20 in electromagnet 12 is approximately inversely proportional to the gap X between electromagnet 12 and the rotor 11. As shown in detail in FIG. 11, supposing that N is total number of turns of coil 20 of electromagnet 12, that A is the cross sectional area of core 30 and that a rotor 11 is a ferromagnetic body (amplitude permeability $\mu \approx \infty$), the relation is $L \approx N^2 A \mu_0/2X = K_L/X$, where $\mu_0$ is initial amplitude permeability and $K_L = N^2 A \mu_0/2$.

Therefore the relation becomes to be $T=(K_L/X) \cdot (\Delta I_p+\Delta Im) \cdot (1/V_h+1/Vm)$, and switching frequency f (=1/T) turns to be f=K'x, but where $K'=(V_h \cdot Vm)/[K_L(\Delta I_p+\Delta Im)(V_h+Vm)]$. Therefore, the switching frequency f is approximately in proportion to gap X.

By the way, the present invention is not limited to the above embodiment. For example, although position of a rotor is controlled in the embodiment described above, in such a way that the phase of two hysteresis amplifiers are compared to each other, the position of a rotor may also as well be controlled in such a way that the phase of a hysteresis amplifier is compared with the phase of a reference signal of a predetermined frequency.

Figure 12:
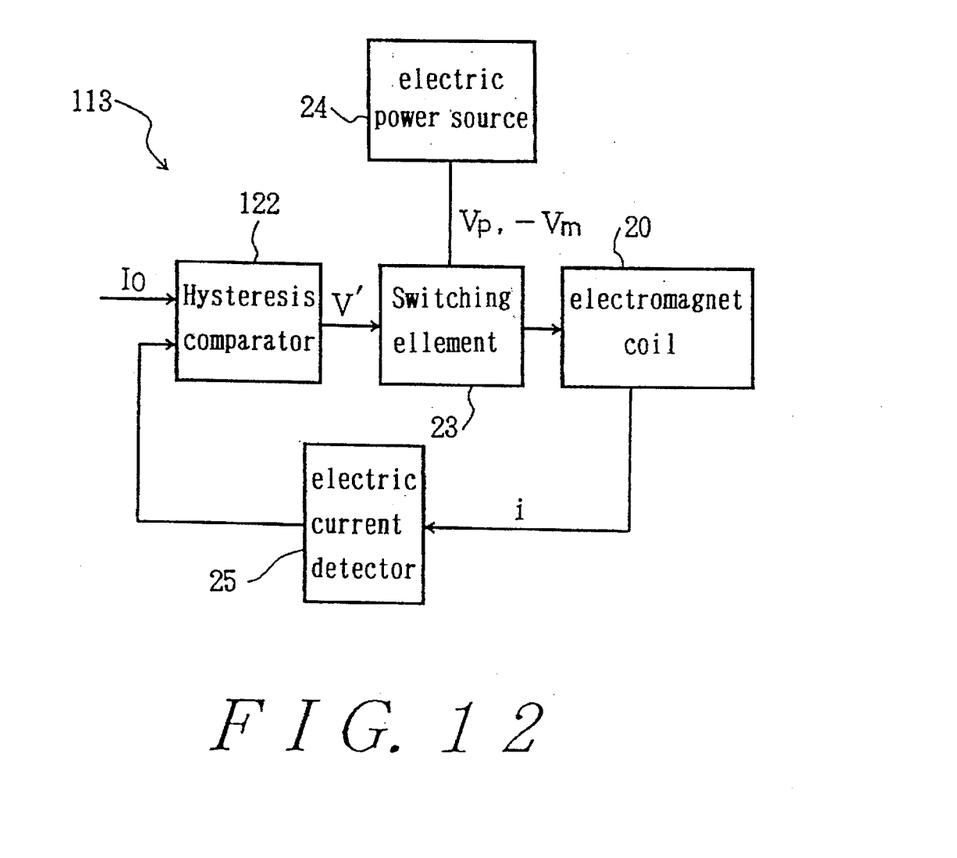
FIG. 12 is a block diagram of another configuration of a hysteresis amplifier.

FIG. 12 shows block diagram of the different configuration concerning hysteresis amplifier.

In this hysteresis amplifier 113, comparison amplifier 21 shown in FIG. 21 is eliminated, and Target current value $I_0$ which is supplied from loop filter 15 in FIG. 1 and output of electric current detector 25 are directly input into hysteresis comparator 122. And this hysteresis comparator 122 has a comparison amplification function. That is, hysteresis comparator 122 outputs the voltage V that is in proportion to the difference between the target current value $I_0$ and coil current i, and is composed such that the threshold value changes according to the past history of output as well as having the hysteresis characteristics as shown in FIG. 5.

Figure 13:
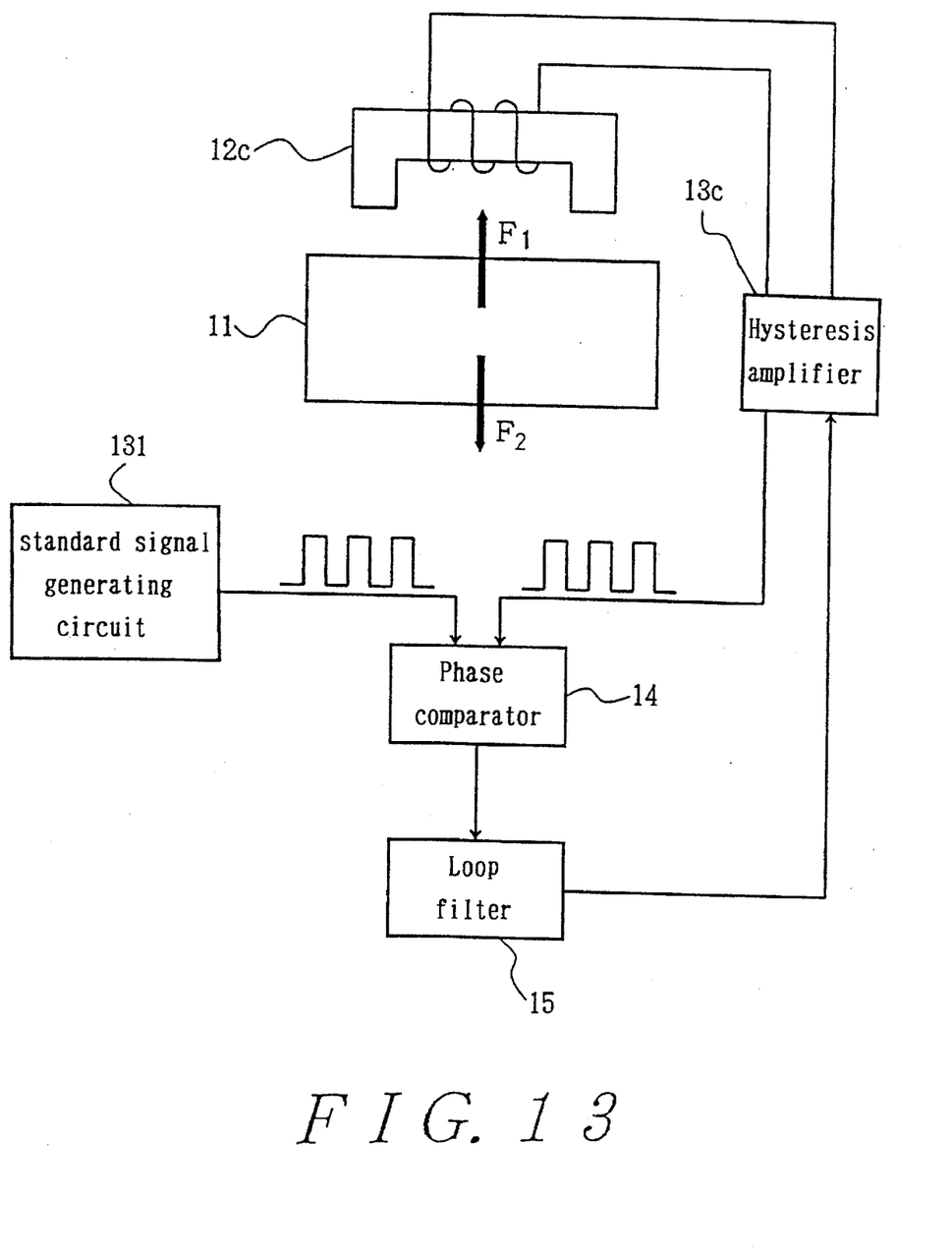
FIG. 13 is a block diagram of a second embodiment of the electromagnetic bearing in accordance with this invention.

FIG. 13 shows the second embodiment of electromagnetic bearing in this invention. For simplification of explanation thereof, the same reference numeral is used to denote the same part as in the first embodiment and duplicate explanation is avoided.

In the second embodiment as shown in FIG. 13 the center of rotating axis of a rotor 11 should be horizontal. Electromagnetic bearing elements include electromagnet 12c which is located above the upper side of a rotor 11, hysteresis amplifier 13c which supplies exciting current to this electromagnet 12c, standard signal generating circuit 131 which outputs a reference or standard signal, phase comparator 14 which detects the phase difference of both wave forms of this standard signal and switching waveform to be input from hysteresis amplifier 13c, and loop filter 15 which supplies direct current to which the output of phase comparator 14 is converted to the hysteresis amplifier 13c.

In this electromagnetic bearing, an exciting current is supplied from the hysteresis amplifier 13c to electromagnet 12c, and with this the attractive force $F_1$ of the electromagnet 12c is generated to levitate and hold the rotor 11. In here the stationary value of attraction force $F_1$ of the electromagnet 12c is controlled to maintain the value required to offset the effect of gravity $F_2$ 11 such that the rotor 11 acts upon the rotor which is held at a predetermined position. By the way, either one of the hysteresis amplifier shown in FIG. 4 or shown in FIG. 12 can be used in this second embodiment.

Since the position of the rotor is detected by monitoring the switching frequency of a hysteresis amplifier according to this invention and as explained above, a position sensor is not needed for this purpose and since the control error is detected at the phase level with a phase locked loop, higher precision control of the rotor position can be realized with simple configuration.

What is claimed is:

1. An electromagnetic bearing comprising: a rotor; an electromagnet for magnetically levitating the rotor at a predetermined position; a hysteresis amplifier for supplying an exciting current to the electromagnet; and control means for controlling the exciting current supplied by the hysteresis amplifier in accordance with a phase of an output of the hysteresis amplifier.

2. An electromagnetic bearing according to claim 1; wherein the hysteresis amplifier comprises a pair of hysteresis amplifiers each for supplying an exciting current to the electromagnet, and the control means includes means for controlling the exciting current supplied by each of the hysteresis amplifiers in accordance with the phase difference of outputs of the hysteresis amplifiers.

3. An electromagnetic bearing according to claim 1; further comprising a reference signal generating means for generating a reference signal, and wherein the control means includes means for controlling the exciting current supplied by the hysteresis amplifier in accordance with a phase of the reference signal and a phase of an output of the hysteresis amplifier.

4. An electromagnetic bearing comprising: a rotor; an electromagnet for magnetically levitating the rotor at a predetermined position; a hysteresis amplifier for driving the electromagnet with an output signal having a switching frequency dependent upon an inductance of the electromagnet; and control means for controlling the hysteresis amplifier to maintain the switching frequency of the output signal constant.

5. An electromagnetic bearing according to claim 4; further comprising reference signal generating means for generating a reference signal having a predetermined switching frequency, and wherein the control means comprises a phase comparator for comparing the phase of the output signal of the hysteresis amplifier with the phase of the reference signal and producing a corresponding correction output signal.

6. An electromagnetic bearing comprising: a rotor; a plurality of electromagnets for magnetically levitating the rotor at a desired position; a plurality of hysteresis amplifiers each for driving a respective electromagnet with an output signal having a switching frequency dependent upon an inductance of the respective electromagnet; a phase comparator for comparing a phase of the respective output signals of the hysteresis amplifiers and producing a phase error output signal; and a loop filter for supplying an input signal to the respective hysteresis amplifiers depending upon the phase error output signal such that the switching frequency of the respective output signals of the hysteresis amplifiers is maintained constant by controlling the input signal of the hysteresis amplifiers.

7. An electromagnetic bearing according to claim 6; wherein the plurality of hysteresis amplifiers each comprise a comparison amplifier for producing an output in accordance with a difference between the input signal to the respective hysteresis amplifier and a current flowing in the respective electromagnet, a hysteresis comparator receptive of an output signal of the comparison amplifier for producing an output depending upon the past history of the input thereto, and a switching element for providing a signal for driving a respective electromagnet depending upon the output of the hysteresis comparator.

8. An electromagnetic bearing according to claim 6; wherein the plurality of hysteresis amplifiers each comprise a hysteresis comparator for producing an output signal in accordance with a difference between the input signal to the respective hysteresis amplifier and a current flowing in the respective electromagnet, and a switching element for providing a signal for driving a respective electromagnet depending upon the output signal of the hysteresis comparator.

9. An electromagnetic bearing according to claim 8; wherein the phase comparator compares outputs of the respective hysteresis comparators.

10. An electromagnetic bearing according to claim 8; wherein the phase comparator compares outputs of the respective switching elements.

11. An electromagnetic bearing comprising: a rotor; an electromagnet for magnetically levitating the rotor in a predetermined position; a hysteresis amplifier for supplying a switching signal for driving the electromagnet, wherein the phase of the switching signal depends upon an inductance of the electromagnet; reference signal generating means for generating a reference signal having a predetermined switching frequency; a phase comparator for comparing a phase of the switching signal with the phase of the reference signal and producing a corresponding error signal; and a loop filter for supplying an input signal to the hysteresis amplifier depending upon the error signal such that the switching frequency of the output signal of the hysteresis amplifier is maintained constant.

* * * * *